US00RE49472E

(19) United States
(12) Reissued Patent
Bahler et al.

(10) Patent Number: US RE49,472 E
(45) Date of Reissued Patent: Mar. 28, 2023

(54) STAKE SECURING A LANDSCAPING EDGING STRIP

(71) Applicant: TOOLBRO INNOVATORS, LLC, Ellington, CT (US)

(72) Inventors: Philip J. Bahler, Ellington, CT (US); Kent R. Bahler, Ellington, CT (US)

(73) Assignee: TOOLBRO INNOVATORS, LLC, Ellington, CT (US)

(21) Appl. No.: 17/070,658

(22) Filed: Oct. 14, 2020

Related U.S. Patent Documents

Reissue of:
(64) Patent No.: 10,398,093
Issued: Sep. 3, 2019
Appl. No.: 15/965,133
Filed: Apr. 27, 2018

U.S. Applications:
(63) Continuation-in-part of application No. 29/632,005, filed on Jan. 4, 2018, now Pat. No. Des. 864,678.

(51) Int. Cl.

| | |
|---|---|
| ***A01G 9/28*** | (2018.01) |
| ***E02D 5/80*** | (2006.01) |
| ***E04H 12/22*** | (2006.01) |
| ***E04H 15/62*** | (2006.01) |

(52) U.S. Cl.
CPC ..... *A01G 9/28* (2018.02); *E02D 5/80* (2013.01); *E04H 12/2215* (2013.01); *E04H 15/62* (2013.01)

(58) Field of Classification Search
CPC ..... A01G 9/28; E02D 5/80; E04H 12/2215; E04H 15/62; A01B 1/02; A01B 1/06; A01B 1/08; A01B 1/14
See application file for complete search history.

(56) References Cited

U.S. PATENT DOCUMENTS 205,685 A * 7/1878 Romaine ..... E04H 12/2215 52/165
412,766 A * 10/1889 Loundsberry ..... E04H 12/2215 52/154
448,180 A * 3/1891 Daniels ..... E04H 12/2215 52/154
484,998 A * 10/1892 Comstock ..... E04H 15/62 135/118
531,196 A * 12/1894 Langton ..... E04H 12/2215 52/154

(Continued)

FOREIGN PATENT DOCUMENTS

CA 1038591 A * 9/1978 ..... E04H 15/62
CA 3001030 * 10/2018 ..... A01G 9/28

(Continued)

*Primary Examiner* — David O Reip
(74) *Attorney, Agent, or Firm* — Cantor Colburn LLP

(57) ABSTRACT

A stake consists of two planar panels joined on a longitudinal axis and angularly disposed with respect to one another. Lower portions of the panels converge to a tip on the axis, and an axial tang is formed at the top of the stake. An inwardly directed flange is formed near the top of each panel, the flanges being disposed substantially in a common plane, generally perpendicular to the panels. The flanges and the tang facilitate driving of the stake into a substrate by use of a power hammer, and the driven stake resists both upward and lateral displacement. It is especially adapted for the securement of edging for restraining paving and landscaping materials.

10 Claims, 6 Drawing Sheets

(56) References Cited

U.S. PATENT DOCUMENTS 545,194 A 8/1895 Buchanan
716,010 A * 12/1902 Eldridge ..... A01K 1/04 119/786
1,146,128 A * 7/1915 Brune ..... E04H 15/62 135/118
1,377,832 A 5/1921 Hanner
1,592,128 A * 7/1926 Steinbreder ..... E04H 15/62 135/118
2,149,081 A * 2/1939 Wright ..... E04H 15/62 135/118
2,322,600 A * 6/1943 Stahler ..... E04H 12/2215 248/545
2,349,110 A * 5/1944 Potstada ..... A01G 9/124 47/47
D164,994 S * 10/1951 Johannesen ..... D21/840
2,783,767 A 3/1957 Smolenski
3,073,433 A 1/1963 Tapper
3,143,783 A * 8/1964 Gaetke ..... E01C 11/08 404/51
3,280,829 A * 10/1966 Glendenning ..... E04H 15/62 135/118
D209,439 S 11/1967 Diederich
3,456,660 A * 7/1969 Borchardt ..... E04H 15/62 135/118
3,534,751 A 10/1970 Peters
3,579,908 A * 5/1971 Morgan ..... A01G 17/06 239/208
D222,983 S 2/1972 Simpson
3,638,863 A * 2/1972 Roberts ..... B05B 15/622 239/276
D230,218 S 1/1974 Frelling
3,788,336 A 1/1974 Steffes
D243,509 S 3/1977 Wheeler
D248,919 S 8/1978 Schmidt, Jr.
4,135,668 A 1/1979 Winkler et al.
4,156,332 A * 5/1979 Thompson ..... E04H 12/2215 52/165
4,167,885 A * 9/1979 Paskert ..... F16B 15/06 411/923
4,195,809 A 4/1980 Morrison
4,258,523 A 3/1981 Waugh
4,520,985 A * 6/1985 Blumenthal ..... A63C 19/062 248/156
4,619,440 A 10/1986 Thevenin et al.
4,699,165 A * 10/1987 Barzana ..... E04H 15/62 135/118
4,718,708 A * 1/1988 Zacuto ..... B25G 3/36 76/113
4,750,508 A * 6/1988 Tatoian ..... E04H 15/003 135/118
4,870,781 A * 10/1989 Jones ..... A01G 29/00 47/43
4,922,654 A 5/1990 Hawke
4,944,476 A 7/1990 Olson
D316,367 S 4/1991 Olson
5,082,231 A * 1/1992 Knowles ..... E04H 12/2215 173/129
5,092,076 A 3/1992 Terreta
5,097,912 A * 3/1992 Bowers ..... E04H 12/2269 173/90
5,212,917 A * 5/1993 Kurtz ..... A01G 9/28 52/102
5,226,829 A * 7/1993 Jones ..... E04H 15/62 135/118
5,230,187 A * 7/1993 Reimann ..... A01K 3/00 52/102
5,240,343 A 8/1993 Strobl, Jr.
5,283,994 A 2/1994 Callison
5,301,461 A * 4/1994 Zwier ..... A01G 9/28 47/33
5,415,194 A * 5/1995 Kaye ..... E04H 15/003 135/115
5,442,877 A 8/1995 Lindhal
D364,785 S 12/1995 Archambeau
D377,076 S 12/1996 Adams
D378,980 S 4/1997 Thayer et al.
5,640,801 A * 6/1997 Rynberk ..... A01G 9/28 47/33
D380,569 S 7/1997 Garber
5,662,134 A * 9/1997 Auer ..... E04H 15/62 135/118
D412,586 S 8/1999 Kenny
D415,018 S 10/1999 Uhler
D419,403 S 1/2000 Halil, Jr.
6,030,144 A 2/2000 Cannella
D422,897 S * 4/2000 Blackwell ..... D8/388
D424,960 S 5/2000 Greene et al.
D426,147 S * 6/2000 Nichols ..... D8/391
6,071,038 A 6/2000 Strobl, Jr.
6,085,458 A * 7/2000 Gau ..... A01G 9/28 47/33
6,099,201 A * 8/2000 Abbrancati ..... A01G 9/28 404/7
D432,371 S 10/2000 Ballard
D438,435 S 3/2001 Whyte
6,230,451 B1 5/2001 Stoller
D446,868 S 8/2001 Schwartz et al.
6,336,599 B1 1/2002 Herr et al.
6,379,078 B1 4/2002 Zwier
D457,039 S 5/2002 Van Alstine
6,401,408 B1 * 6/2002 Schwartz ..... E02D 27/42 248/499
6,402,115 B1 * 6/2002 Groff ..... B29C 45/14426 248/156
6,409,421 B1 6/2002 Jones
6,461,084 B1 * 10/2002 Stuart ..... E04H 12/2215 248/156
D469,566 S 1/2003 Gary et al.
6,668,484 B2 12/2003 Riccobene
D493,205 S * 7/2004 Combes ..... D21/840
6,767,159 B2 7/2004 Jones
7,195,421 B2 3/2007 Dunbar
D553,919 S 10/2007 Gross et al.
D574,520 S 8/2008 Taylor et al.
D582,732 S 12/2008 Cox
7,472,874 B2 1/2009 Gross et al.
D600,823 S 9/2009 Ratanasiriailai
D600,824 S 9/2009 Ratanasiriwilai
D600,825 S 9/2009 Ratanasiriwilai
D616,113 S 5/2010 Budzik
7,774,993 B2 8/2010 Strobl, Jr. et al.
7,967,524 B2 6/2011 Jones
8,038,082 B2 10/2011 Belford
D706,095 S 6/2014 Evans
8,915,027 B1 12/2014 Alfieri et al.
9,689,176 B1 6/2017 Ovitt
10,398,093 B2 9/2019 Bahler et al.
10,729,077 B2 8/2020 Bahler et al.
2003/0084620 A1 * 5/2003 Benincasa ..... E02D 5/80 52/155
2008/0163566 A1 7/2008 Bella
2009/0038238 A1 2/2009 Kurtz et al.
2010/0186293 A1 7/2010 Flynn
2010/0223825 A1 * 9/2010 Martin ..... A01G 9/006 40/645
2010/0293871 A1 11/2010 Strobl, Jr. et al.
2013/0263531 A1 * 10/2013 Goodman ..... A01G 9/28 52/155
2014/0259902 A1 * 9/2014 Friederichs ..... A01G 9/28 47/33
2018/0155892 A1 * 6/2018 Kelleher ..... F24S 25/617
2019/0174685 A1 6/2019 Wang et al.

FOREIGN PATENT DOCUMENTS

CA 3001030 A1 10/2018
DE 1020110034600 A1 2/2012
EP 1430768 A1 6/2004
FR 1201689 A * 1/1960 ..... E04H 15/62
GB 191114174 A 6/1912

(56) References Cited

FOREIGN PATENT DOCUMENTS

| | | | | | |
|---|---|---|---|---|---|
| GB | 184586 | A | * | 8/1922 | ..... A01G 17/14 |
| KR | 20180047964 | A | | 5/2018 | |
| WO | 2005055701 | A1 | | 6/2005 | |

* cited by examiner

STAKE SECURING A LANDSCAPING EDGING STRIP

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATION

This application is a Continuation-in-Part of U.S. Design patent application No. 29/632,005, filed Jan. 4, 2018 and entitled "STAKE."

BACKGROUND OF THE INVENTION

Various forms of stakes are widely employed for a variety of purposes; e.g., as supports, props, tethers, braces, fencing, boundary markers, etc. Of particular interest to the present invention is the provision of a stake that is effective for the securement of a structural member against a surface, especially a structural member that serves for the retention and restraint of landscaping or covering materials, pavers, and the like, deposited or laid upon the ground, a base, or other substrates.

Such restraint and retention members are described in the prior art. For example, U.S. Pat. No. 5,240,303 provides a structure for holding paving blocks, which structure is secured by driving nails through it into the ground. U.S. Pat. No. 7,774,993 provides an elongated landscape retaining or edging strip that is held in place by spikes, driven into the ground, for retention and/or separation of beds of earth or other landscaping fill (i.e., gravel, rock, bark, dirt, sand, mulch) or the retention and maintenance of paving materials (i.e., bricks, paving stones, rock, gravel, etc.).

As is emphasized in both of the above-identified patents, the natural freezing and thawing cycle of the ground (and other permeable outdoor substrates), as well as vehicular the pedestrian traffic, causes movement of deposited landscaping and paving materials. Also recognized therein it the tendency of securing nails and spikes to come loose and pull up out of the ground. Lateral displacement of the ground-engaging fasteners, for which there is a particular tendency with packed clear or open stone substrates, does not appear to have been recognized or addressed.

SUMMARY OF THE INVENTION

Accordingly, it is the broad object of the present invention to provide a novel stake that is constructed for being driven into a surface, which stake resists lateral as well as axial displacement.

It is also an object of the invention to provide such a stake which is especially adapted for being driven by a power hammer (but can also be driven manually, such as with a mallet).

A more specific object of the invention is to provide a stake having the foregoing features and advantages, which is especially adapted for the securement of a structural member against a supporting surface, particularly for the securement of a structural member that comprises a lateral retaining or restraining wall and, especially, an edging member for landscaping, covering, or paving materials.

An additional broad object of the invention is the provision of a novel assembly of a structural member, in particular a structural member that comprises a length of edging for retaining or restraining landscaping, covering, and paving materials, and a stake for the ground or substrate engaging securement thereof.

It has now been found that certain of the foregoing and related objects of the invention are attained by the provision of a stake constructed to be driven lengthwise into a surface and having a top, a bottom, and opposite lateral edges, the stake being comprises of two generally planar panels joined to one another along a common rectilinear longitudinal axis and disposed with a internal angle of 45° to 135° therebetween. Each of the two panels provides one of the opposite lateral edges extending substantially along the entire length of the stake, with the lateral edges of the panels converging, at least along a lower portion of the stake, to form a tip on the common longitudinal axis at the bottom of the stake. A flange portion is provided at the top of each of the panels of the stake, spaced from its longitudinal axis; the flange portions extend inwardly of the stake and are disposed substantially in a common plane that is generally perpendicular to the planes of the panels. A tang portion extends upwardly beyond the flange portions at the top of the stake, on the longitudinal axis.

Generally, the stake will be fabricated from a strong, rigid metal, and integrally formed as a single piece. The internal angle between the panels of the stake will usually have a value of about 90°, and the stake will usually be substantially symmetrical about its longitudinal axis.

Other objects of the invention are attained by the provision of an assembly comprised of a structural member constructed for being disposed against a supporting surface; and a stake for securing said structural member against such a surface. The structural member has at least one generally V-shaped aperture extending through a portion thereof, comprised of two connected slot elements disposed at an angle of about 40° to 135° to one another. The stake is constructed, as herein described, for being driven lengthwise through the aperture in the identified portion of the structural member.

In preferred embodiments of the assembly described, the "portion" of the structural member referred to will comprise a bottom wall having front and read edges, and the structural member will further comprise a lateral wall upstanding along one of the edges of the bottom wall. The V-shaped aperture in the bottom wall will preferably have an apex between slot elements of which it is comprised, and be oriented with the apex proximate the lateral wall. Most desirably, the structural member comprising the assembly will be in the form of a length, typically eight feet long, of edging for retaining and restraining landscaping, covering, or paving material, with the bottom wall and the lateral wall thereof being substantially perpendicular to one another and formed with a multiplicity of apertures. As installed, the bottom wall of such edging will normally be substantially horizontal (depending upon underlying surface characteristics), and the lateral wall will normally be substantially vertical.

DETAILED DESCRIPTION OF THE PREFERRED AND ILLUSTRATED EMBODIMENTS

Figure 1:
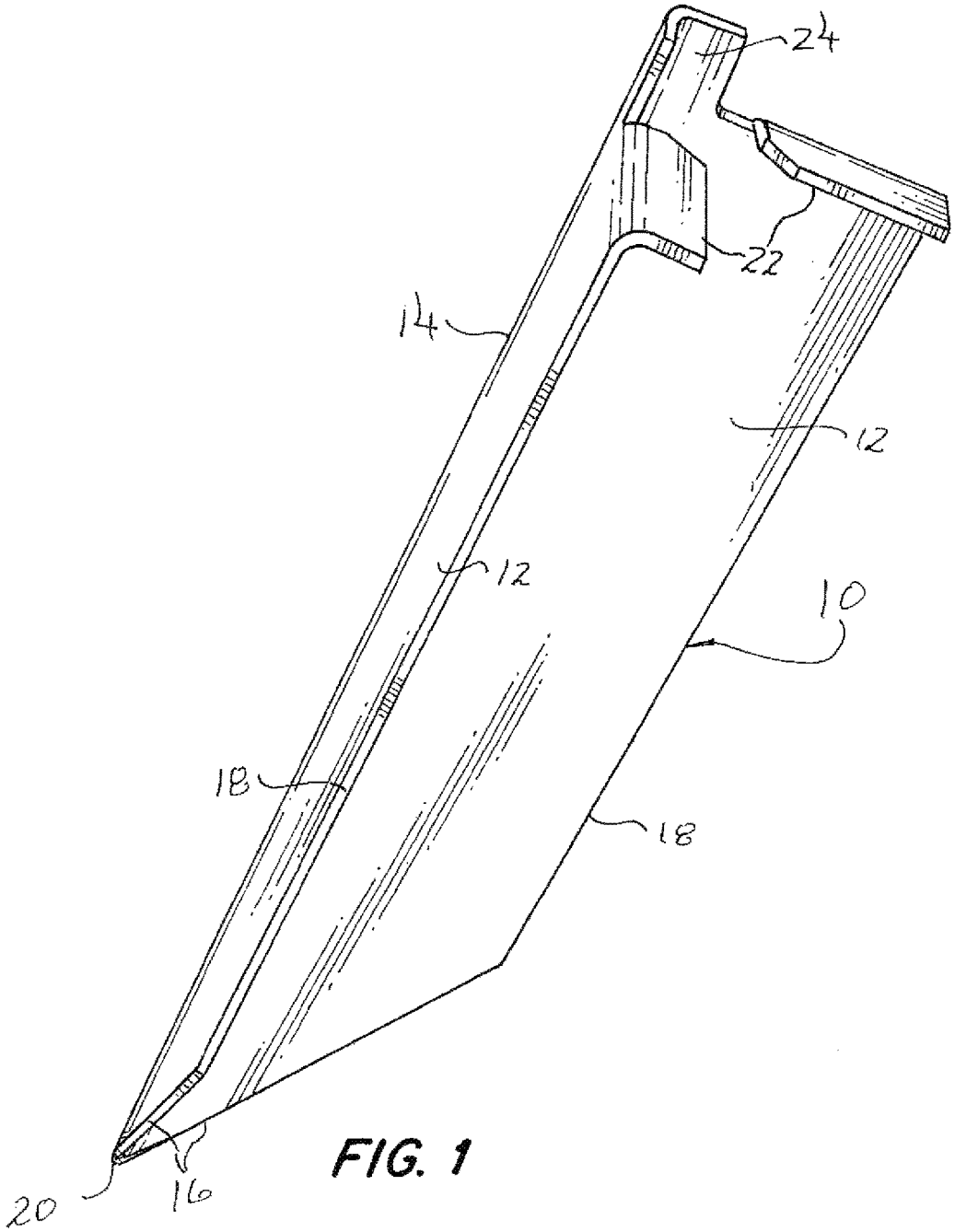
FIG. 1 is a perspective view of a stake embodying the present invention.
Figure 3:
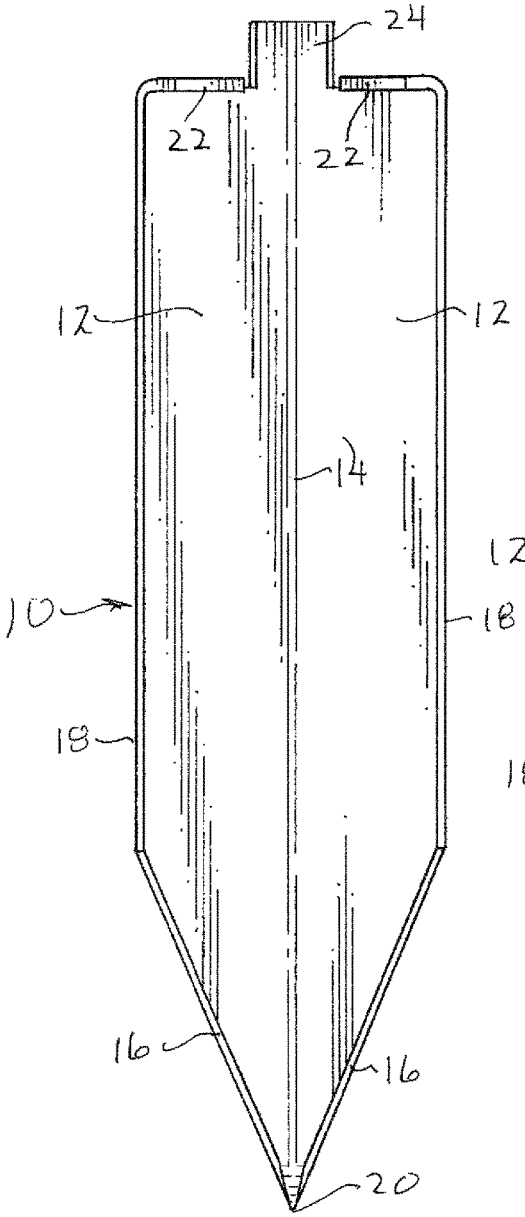
FIG. 3 is a back elevational view, showing the interior of the stake.
Figure 2:
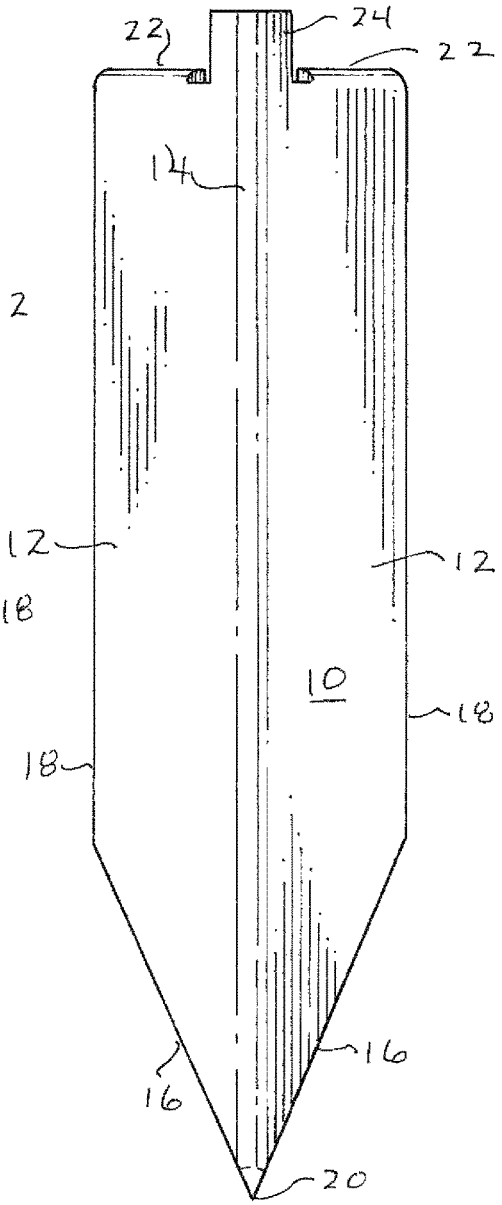
FIG. 2 is a front elevational view, showing the exterior of the stake.
Figure 5:
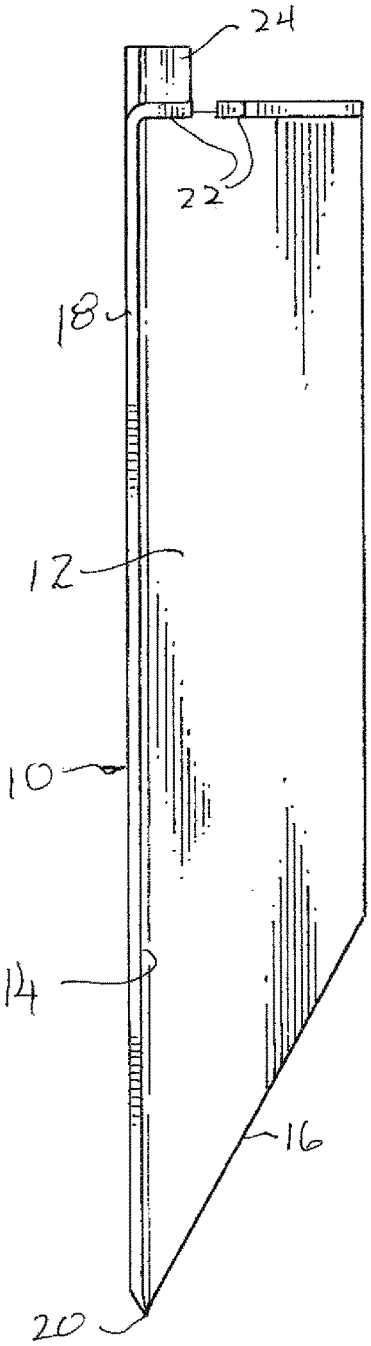
FIG. 5 is a side elevational view showing the interior of the stake; a view rotated 90°, in a clockwise direction about a longitudinal axis and referenced from above, being a mirror image thereof.
Figure 4:
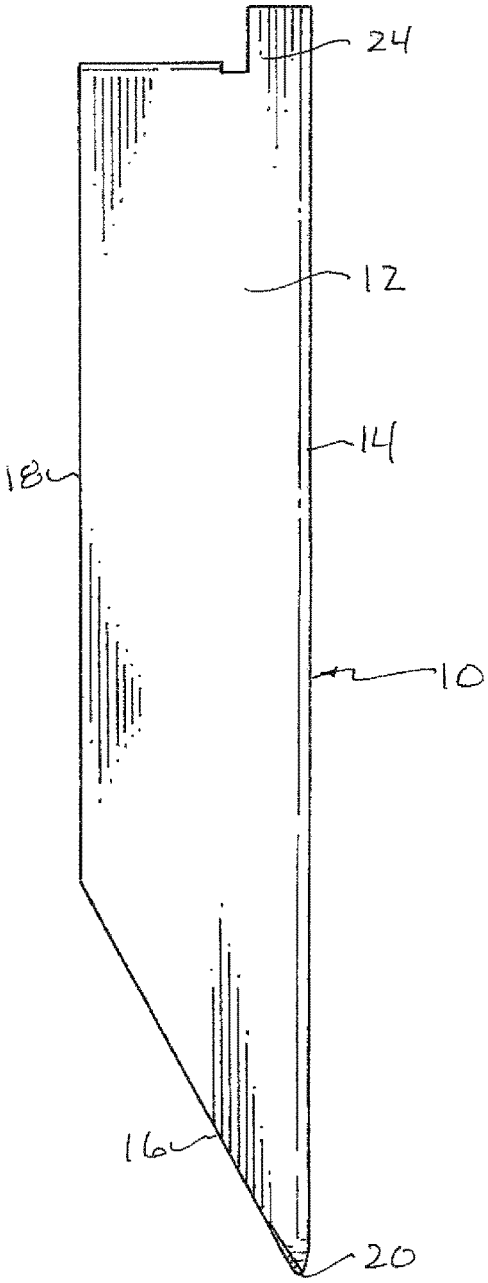
FIG. 4 is a side elevational view showing the eterior of the stake, a view rotated 90°, in a counter-clockwise direction about a longitudinal axis and referenced from above, being a mirror image thereof.
Figure 6:
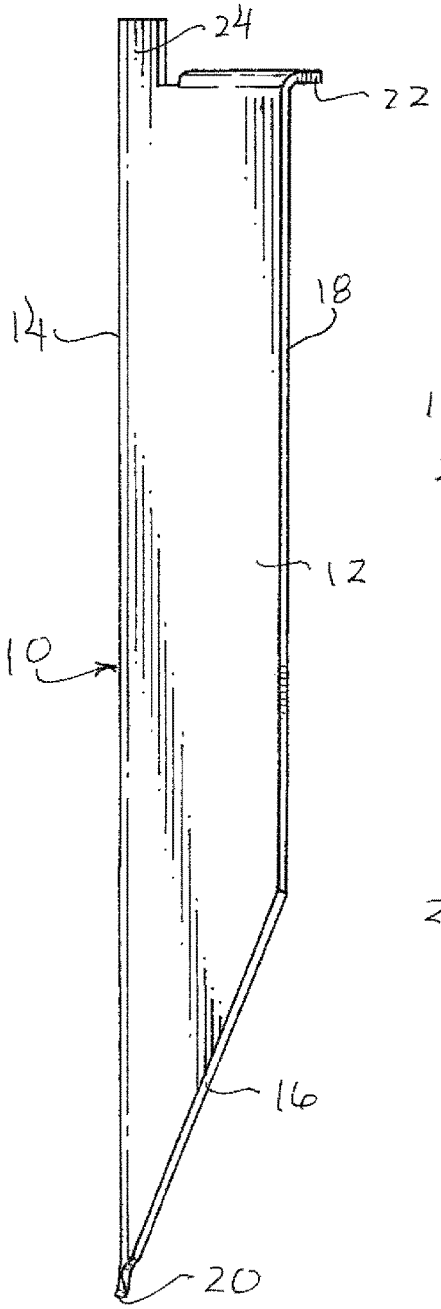
FIG. 6 is an orthogonal elevational view of the stake; a view rotated 180° about a longitudinal axis being a mirror image thereof.
Figure 7:
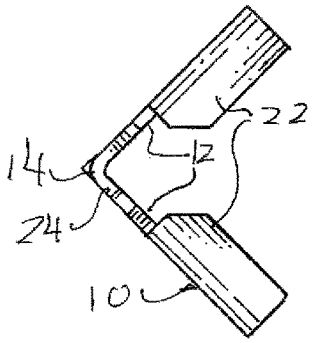
FIG. 7 is a top view of the stake.
Figure 8:
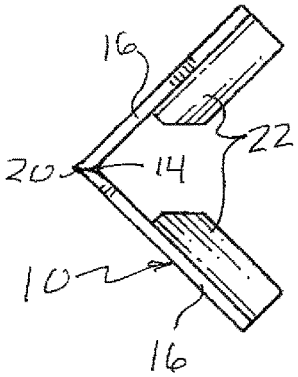
FIG. 8 is a bottom view of the stake.

Turning now in detail to FIGS. 1 through 8 of the drawings, therein illustrated is a stake, generally designated by the numeral 10, embodying the present invention. The stake 10 comprises two planar panels 12, joined to one another along a common longitudinal axis 14 at 90° angle. Lower portions 16 of the lateral edges 18 of the panels 12 are inclined to converge to a tip 20 on the bottom of the stake 10 and on its longitudinal axis 14, the tip being sufficiently pointed to facilitate penetration into a substrate of choice.

Upper portions of the panels 12 are cut longitudinally, at a short distance from the axis 14, to define tabs, which are bent inwardly to provide a flange portion 22 on each panel 12. The flange portions 22 are disposed substantially in a common plane, which lies substantially perpendicular to the planes of the panels 12. Undistorted areas of the panels 12 cooperatively define a tang portion 24, of V-shaped transaxial cross section, which extends upwardly of the flange portions 22 on the longitudinal axis 14.

As will be appreciated, the stake 10 can conveniently and economically be fabricated from steel (as "angle iron,"), aluminum, or other metals, by conventional means. However, depending in part upon the intended application, stakes embodying the invention may be molded from suitable strong and rigid synthetic resinous materials, compositions of which will be evident to those skilled in the art, having in mind the functions and features described herein. Typically, stakes embodying the invention (as used for securing an edging member, described below) will be about 10 to 14 inches long and about two inches on a side, but again proportions and dimension may vary widely depending upon the specific intended application and other self-evident factors; generally, through, the stake will not be less than six or more than 24 inches long.

Figure 9:
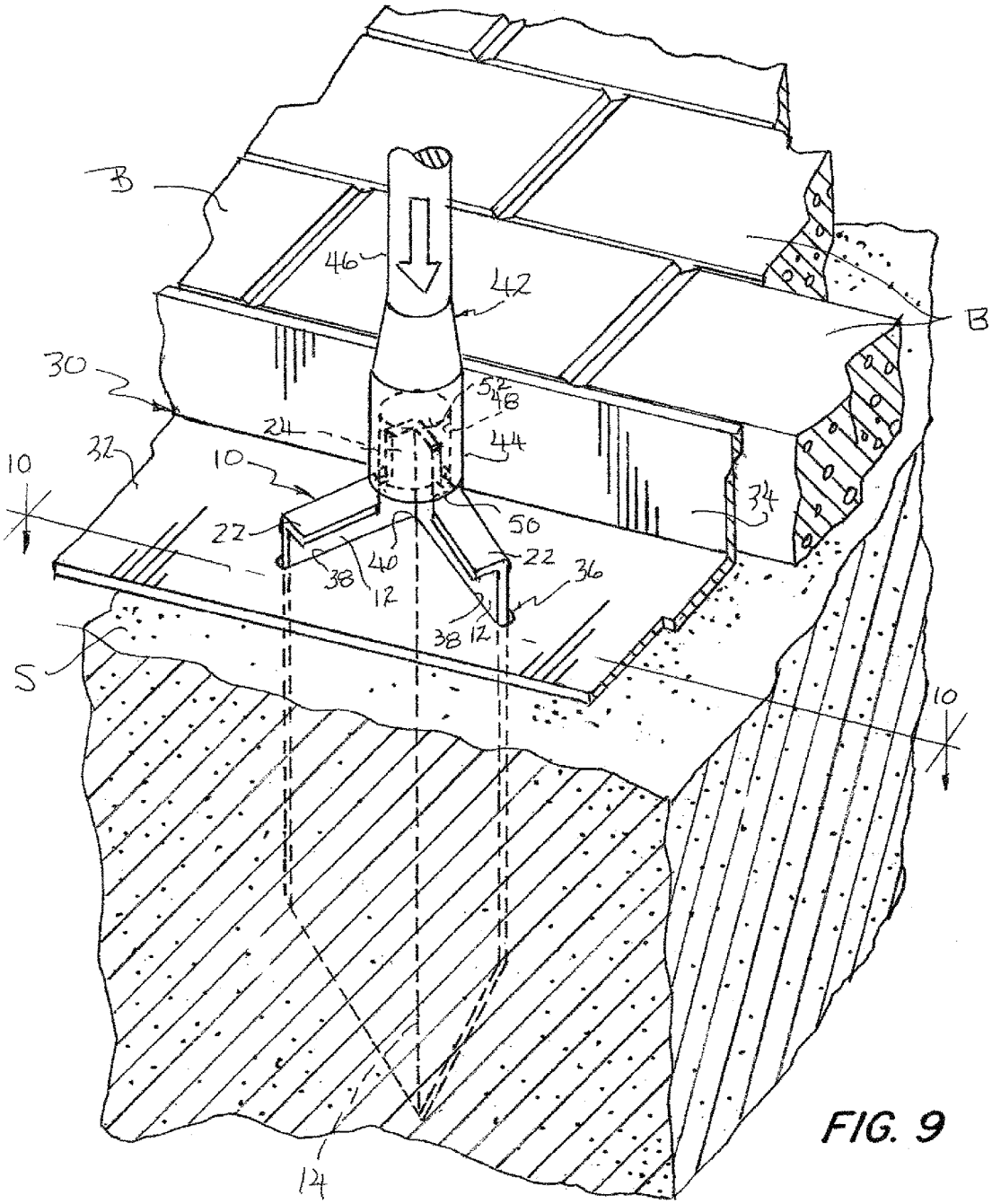
FIG. 9 is a perspective view, in partial section, of an assembly embodying the invention and showing the stake thereof being driven through an edging member, fragmentarily illustrated, which member engages a course of paving blocks supported upon a substrate into which the stake is driven.
Figure 10:
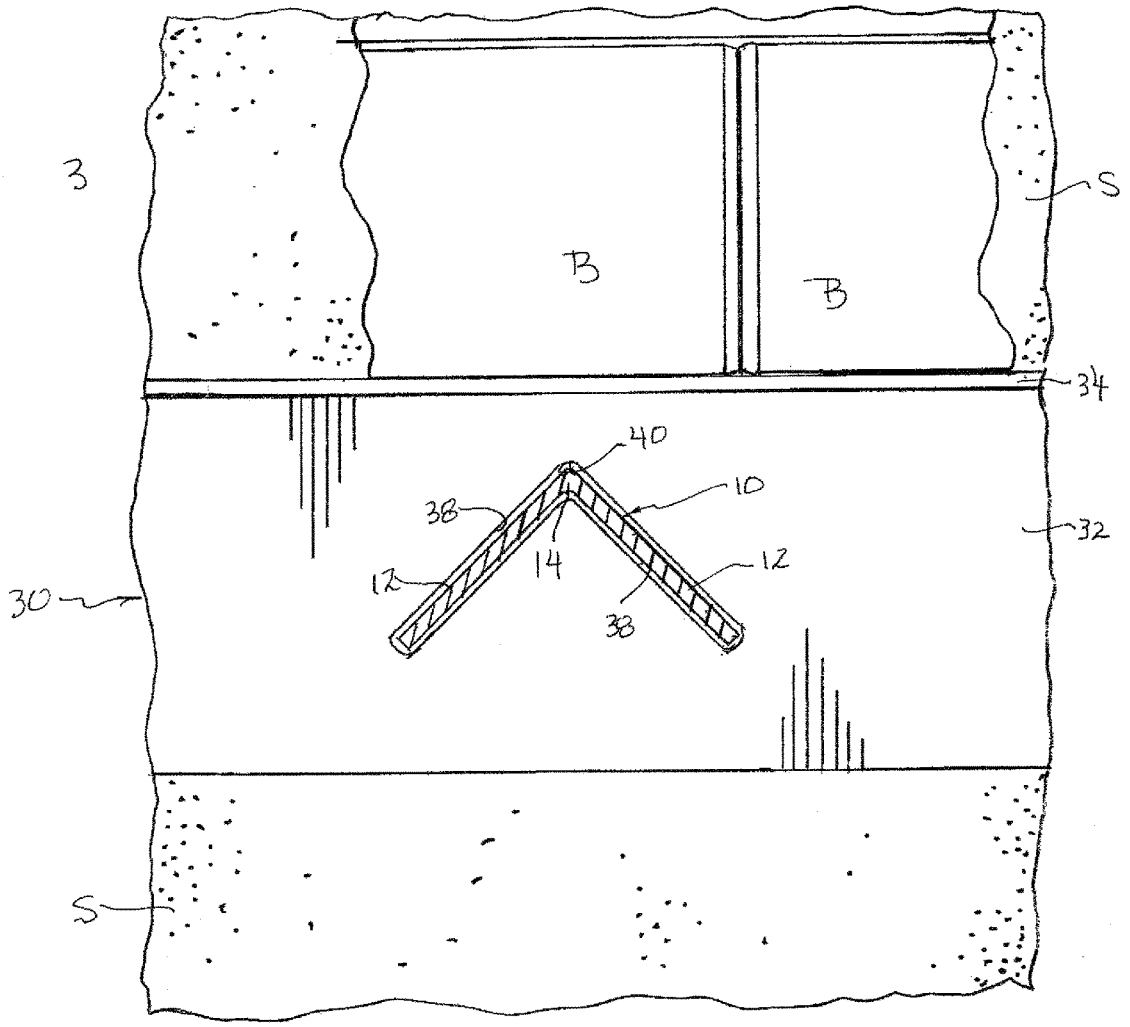
FIG. 10 is a plan view of the assembly, showing the stake in transaxial cross section taken along line 10-10 in FIG. 9.

Turning now in greater detail to FIGS. 9 and 10 of the drawings, shown therein is a stake 10 embodying the invention assembled with a length of an edging member, or strip, generally designated by the numeral 30 (shortened for purposes of illustration). The edging member 30 comprises a base wall 32 and a perpendicular lateral wall 34, upstanding along one edge (which might be regarded to be a forward edge) of the base wall 32.

As best seen in FIG. 10, the base wall 32 is formed with a V-shaped aperture, generally designated by the numeral 36, comprises of two connected slots 38, relatively disposed at a 90° angle to meet at an apex 40. The ape 40 is oriented to lie proximate the lateral wall 34 of the edging member 30. Generally, such a strip 30 will (at full length) contain a multiplicity of apertures 36, spaced along its length.

FIG. 9 shows the stake being 10 driven through the aperture 36 in the base wall 32 into a substrate S (e.g., a bed of stone, gravel, aggregate or the like or, needless to say, simply the earth). As depicted, the stake is being driven by a power hammer, generally designated by the numeral 42 (only the head 44 and a connecting shaft 46 of which are shown). The hammer head 44 is formed with an upwardly extending socket 48, opening from a rim 50. As can be seen, the tang portion 24 or the stake 10 is received in the socket 48 of the hammer head 44, with the rim 50 engaging the flanges 22 of the stake. As will be evident, the flanges will most effectively receive and transmit to the stake 10 the hammer blows; however, if the socket 48 is of optimal depth, the top end of the tang portion 24 will also come into contact with the wall 52 that defines the inner end of the socket 48, thus enhancing the effectiveness of the hammer blows for driving the stake 10 longitudinally into the substrate S.

Needless to say, the flanges 22 also serve to reinforce and strengthen the stake panels 12 and, when the stake 10 is driven home, to provide good contact with the areas of the base wall 32 of the edging member 30 adjacent the slot portions that define the V-shaped aperture 36, and thus maximizing the hold-down force. It also goes without saying that the large surface areas presented by the panels 12 afford a high level of frictional engagement with the medium of the substrate S into which the stake 10 is driven, thereby optimizing its holding power.

As seen in FIG. 9, the upright lateral wall 34 of the edging member 30 engages the sides of the proximate course of paving blocks B laid upon the substrate S, to restrain them against lateral shifting or spreading movement due not only to forces of pedestrian and/or vehicular traffic but also due to lifting and shifting effects of freeze/thaw cycles to which the substrate S may be subjected (in cold climates). It should be emphasized that the depicted orientation of the V-shaped aperture 36 in the base wall 32, with its apex 40 proximate the upstanding wall 34, maximizes the resistance of the stake 10 to forces generated by lateral movement of the material of the substrate S in directions away from areas of restrained or retained landscaping or paving, allowing the material to migrate along the outer surfaces of the panels 12 rather than being trapped within the interior of the stake. However, the reverse orientation, and alternating orientations of a multiplicity of apertures along the length of an edging member (as will normally be present), may be provided, as appropriate.

It will be appreciated that the assembly herein described can be employed against any suitable substrate, and that edging embodying the structural member thereof may be used to restrain, retain, and/or confine any paving, covering, or landscaping material mentioned hereinabove or otherwise known to those skilled in the art. Normally, such edging will be molded from a synthetic resinous material, such as high density polyethylene; but metals such as steel and aluminum may also be used for fabrication, if so desired and/or for reasons of economy.

Thus, it can be seen that the present invention provides a novel stake that is constructed for being driven into a surface, which stake resists lateral as well as axial displacement and is particularly adapted for being driven by a power hammer. The stake of the invention is especially adapted for the securement of a structural member against a supporting surface, particularly for the securement of a structural member that comprises a lateral retaining or restraining wall, and especially edging (i.e., a restraining member) for landscaping, covering, or paving materials. The invention also provides novel assembly of a structural member, in particular a structural member that comprises a length of edging, and a stake for the substrate-engaging securement thereof.

Having thus described the invention, what is claimed is:

1. An assembly comprised of a length of edging for retaining or restraining a landscaping, covering, or paving material, including a bottom wall having front and rear edges, and a lateral wall upstanding along one or said edges of said bottom wall, said bottom wall and said lateral wall of said length of edging being substantially perpendicular to one another, said length of edging being constructed for being disposed against a supporting surface; and a stake for securing said length of edging against such a surface; said length of edging having at least one generally V-shaped aperture extending through said bottom wall thereof and consisting essentially of two slot elements connected at adjacent ends thereof and disposed at an angle of about 45° to 135° to one another, said at least one aperture in said bottom wall having an apex between said adjacent ends of said slot elements and being oriented with said apex proximate said lateral wall of said length of edging, and said stake being constructed for being driven, lengthwise through said aperture in said bottom wall of said length of edging; said stake having a top, a bottom, and opposite lateral edges, and being comprised of two generally planar panels joined to one another along a common rectilinear longitudinal axis and disposed with an internal angle corresponding to the angle between said slot elements of said aperture through said bottom all of said length of edging, each of said panels providing one of said opposite lateral edges extending substantially along the entire length of said stake, said lateral edges of said panels converging, at least along a lower portion of said stake, to form a tip on said common, longitudinal axis at the bottom of said stake, each of said panels having a flange portion at the top of said stake spaced from said longitudinal axis, said flange portions [extending inwardly of said stake and] being disposed substantially in a common plane that is generally perpendicular to the planes of said panels, said panels cooperatively forming a tang portion at the top of said stake, on said longitudinal axis, extending upwardly beyond said flange portions.

2. The assembly of claim 1 wherein said stake is fabricated from, a strong, rigid metal.

3. The assembly of claim 1 wherein said stake is integrally formed, as a single piece.

4. The assembly of claim 1 wherein said slots of which said aperture consists essentially are disposed at an angle of about 90° to one another.

5. The assembly of claim 1 wherein said stake is substantially symmetrical about said longitudinal axis.

6. The assembly of claim 1 wherein said length of edging is fabricated from a synthetic resinous material.

7. The assembly of claim 1 wherein said tang portion of said stake is of V-shaped transaxial cross section.

8. A stake constructed to be driven lengthwise into a surface, and having a top, a bottom, and opposite lateral edges, said stake being integrally formed as a single piece from a strong, rigid metal, and consisting essentially of two generally planar panels joined to one another along a common rectilinear longitudinal axis and disposed with an internal angle of 45° to 135° therebetween, each of said two panels providing one of said opposite lateral edges extending substantially along the entire length of said stake, said lateral edges of said two panels converging, at least along a lower portion of said stake, to form a tip on said common longitudinal axis at the bottom of said stake, each of said panels having a flange portion at the top of said stake spaced from said longitudinal axis, said flange portions [extending inwardly of said stake and] being disposed substantially in a common plane that is generally perpendicular to the planes of said panels, said panels cooperatively forming a tang portion, of V-shaped transaxial cross section, at the top of said stake, on said longitudinal axis, extending upwardly beyond said flange portions.

9. The stake of claim 8 wherein said internal angle has a value of about 90°.

10. The stake of claim 8 wherein said stake is substantially symmetrical about said longitudinal axis.

* * * * *